Inventors
DONALD JACKSON
JOHN D. F. GREEN
By Emery Holcombe & Blair
Attorneys

Inventors
DONALD JACKSON
JOHN D. F. GREEN
By Emery Holcombe + Blair
Attorneys

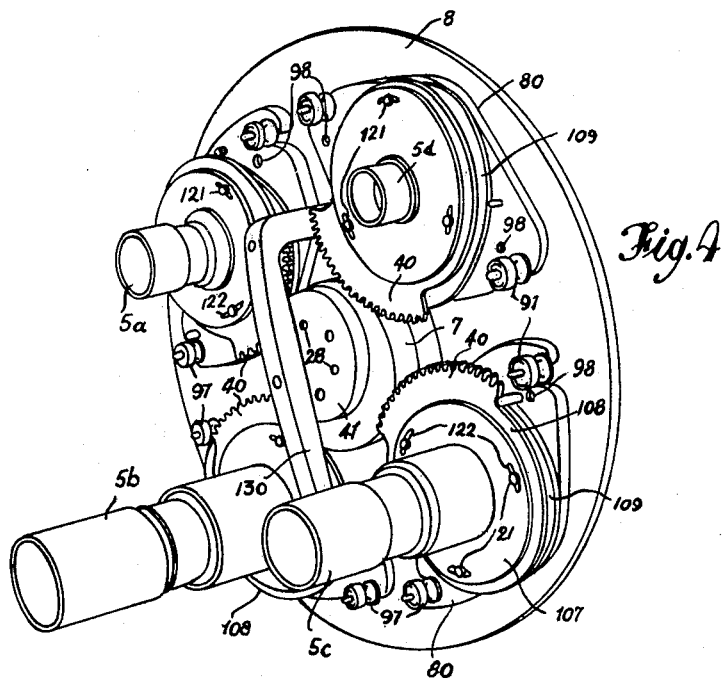
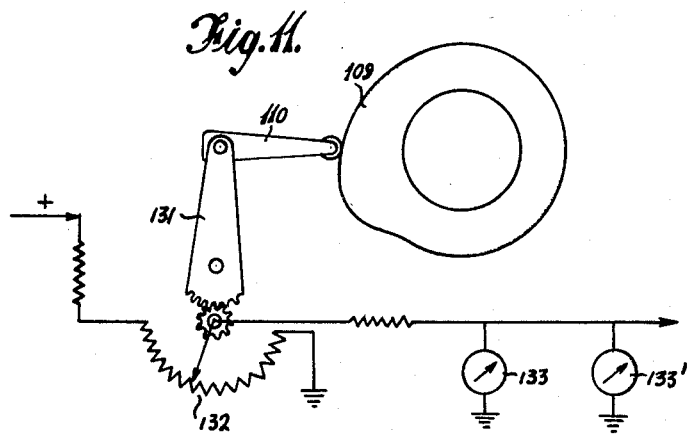

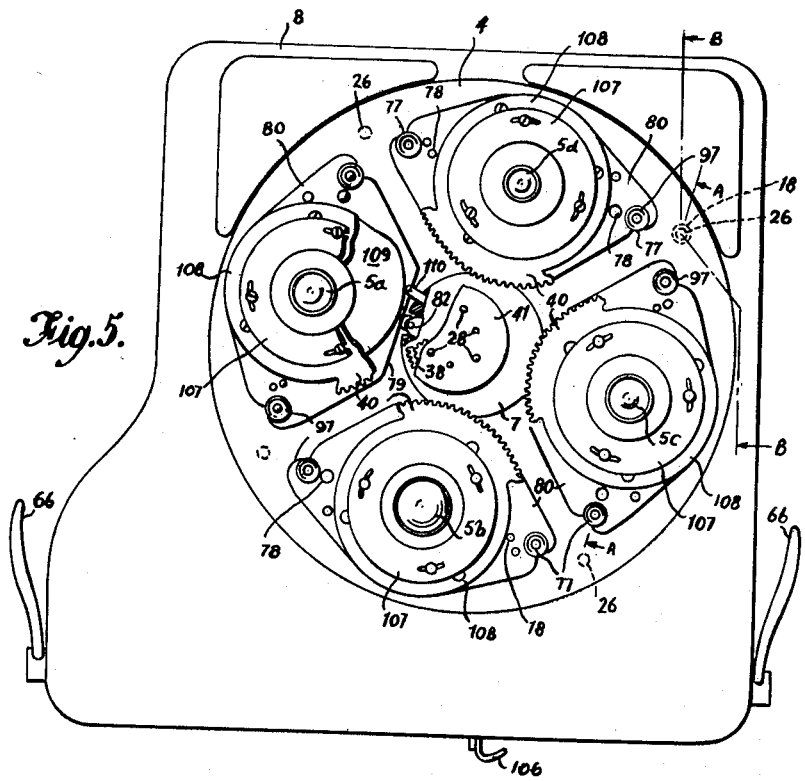
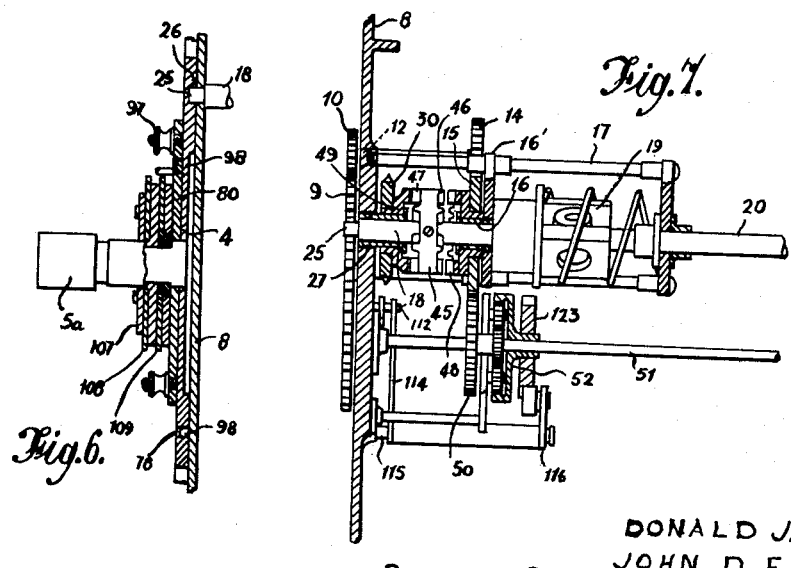

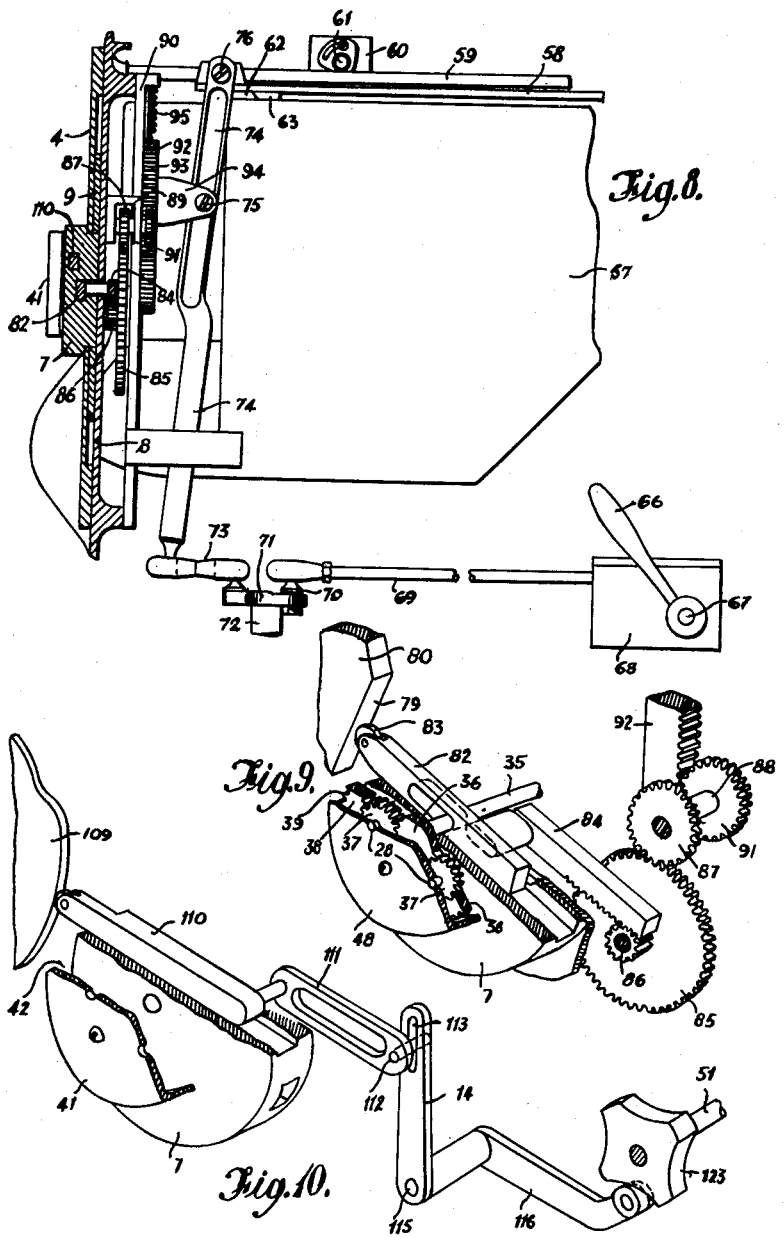

United States Patent Office 2,725,805
Patented Dec. 6, 1955

2,725,805

CAMERAS, PARTICULARLY TELEVISION CAMERAS

Donald Jackson and John Dudley Francis Green, Cambridge, England, assignors to Pye Limited, Cambridge, England, a British company Original application March 14, 1949, Serial No. 81,234, now Patent No. 2,572,729. Divided and this application September 27, 1950, Serial No. 187,082

Claims priority, application Great Britain March 16, 1948

7 Claims. (Cl. 95—64)

The present invention relates to cameras, particularly television cameras, and is divided out of application Serial No. 81,234 filed March 14, 1949, now Patent No. 2,572,729.

When televising live action scenes it is often desirable to change the lens in the television camera, and for this purpose a plurality of lenses may be mounted upon a turret arranged on the front of the camera which can be rotated to bring any one of the lenses mounted thereon into the operative position in alignment with the optical axis of the pick-up tube, the turret being locked in the various operative positions by means of suitable indexing means. With a change of lens the camera has to be refocussed which may be effected by moving the pick-up tube relative to the lens positioned in front thereof. With different lenses the relative movement of the lens and pick-up tube for focussing through all distances up to infinity changes, but it is desirable that the focus control should be adjustable through the same range of movement irrespective of the lens which is in use, and a focus control which enables this result to be obtained, forms the subject of our said co-pending application Serial No. 81,234 filed March 14, 1949, and the present invention is particularly, but by no means exclusively, intended for use in television cameras incorporating the invention of our said application Serial No. 81,234.

It is also desirable that the adjustment of the iris diaphragms of the various lenses should be indicated by means visible from the rear of the camera and that they should also be adjustable from this position, thus enabling the operator to know the correct stop of the lens which is located in front of the pick-up tube. It is therefore an object of the invention to provide a control and indicating arrangement for the iris diaphragms of the different lenses mounted on the turret which is visible and operable from the rear of the camera.

According to this feature, the invention consists in a television camera having a plurality of different lenses and associated iris diaphragms mounted on a turret at the front of the camera, wherein each diaphragm control means is connected to a cam which is adapted to engage with means, such as a tappet, for actuating an indicator when the associated lens is positioned in the operative position on the camera, the rotation of the diaphragm control means thereby also moving the cam and altering the setting of the indicator which may be located at the rear of the camera. The cams associated with the diaphragm control means of the different lenses are so shaped, corresponding to the lenses with which they are associated, that the indicator which may be calibrated in "f" numbers, will give the correct reading irrespective of the particular lens which is in use at any time. Furthermore, since the indicator is set by a cam which is moved into the operative position as the turret is rotated, the setting is correct without having to restore both the indicator and diaphragm to a zero setting before bringing them into operative co-relation.

The diaphragm control means may also carry a toothed segment which is adapted to engage with a driving gear when the associated lens is moved to the operative position. This driving gear may be coupled to an operating knob or the like arranged adjacent the rear of the camera and is preferably coupled with the locking pin or the like associated with the indexing means so that, when the locking pin is withdrawn to allow the turret to be rotated, the driving gear is simultaneously disengaged from the gear segment of the diaphragm control means, the driving gear being engaged with the diaphragm control means of the next lens which is moved to the operative position when the locking pin is again moved to the locking position to hold the turret in the new position.

Since the wide range of lenses may be mounted upon the turret plate of which the iris diaphragm cams are of widely different shape, a further feature of the invention consists in withdrawing the iris tappet whilst the turret is turning and allowing it to move back into engagement with the iris cam as the turret approaches an indexing position.

In order that the invention may be more clearly understood, reference will now be made to the accompanying drawings, in which:

Fig. 4 shows a perspective view of the turret with its cover plate removed,

Fig. 5 is a front view of Fig. 4 with some parts cut away to show constructional details, Fig. 6 shows a section through the lens unit along the line A—A in Fig. 5, Fig. 7 shows a scrap side view, partly in section of the clutch mechanism for driving either the turret of iris diaphragm, together with the adjacent mechanism, the view being taken approximately along the line B—B in Fig. 5.

Fig. 8 is a scrap side view of the focussing lever mechanism, with the camera front wall, turret plate and boss shown in section.

Fig. 9 is an enlarged cut-away perspective view of the boss showing the coupling between the focussing tappet and the mechanism within the camera box.

Fig. 10 is an enlarged cut-away perspective view of the boss showing the coupling between the iris tappet and the mechanism within the camera box.

Fig. 11 shows a detail of a modification.

Figure 1:
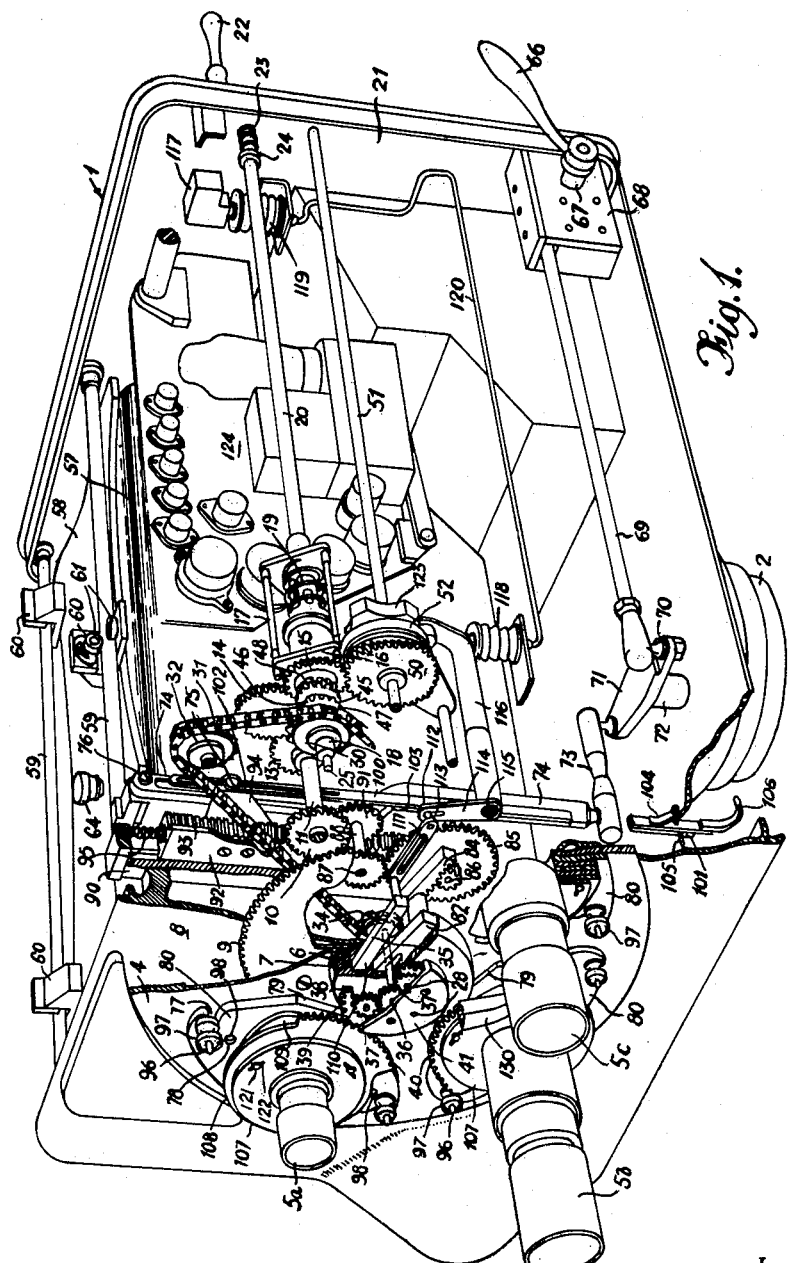
Fig. 1 shows a perspective view of the camera from the front and partly cut away to show the details and arrangement of the operating mechanism, all cover plates being removed.
Figure 2:
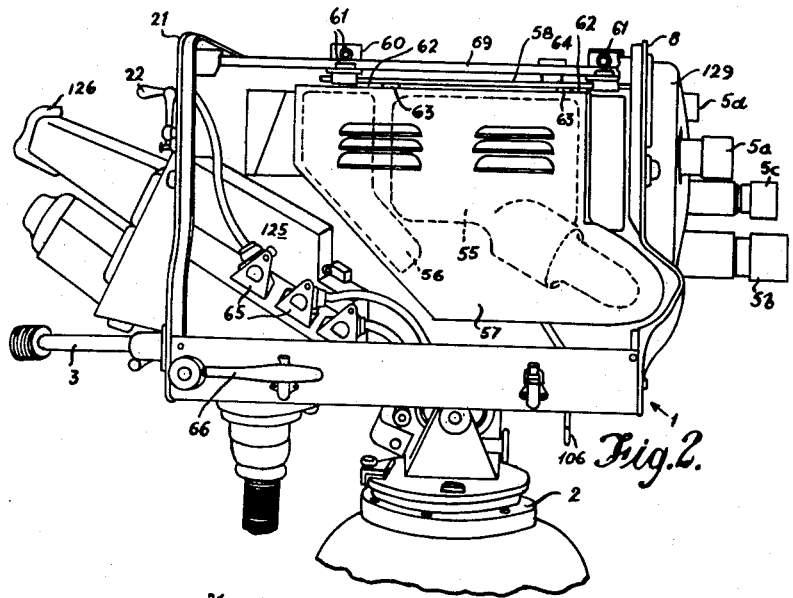
Fig. 2 shows a side view of the camera from the other side.

Referring to the drawings, the television camera 1 is generally of rectangular box-like form and is mounted upon a stand 2 so as to be movable in both horizontal and vertical directions by moving the handle 3. On the front of the camera is mounted a rotatable turret plate 4 carrying any convenient number of lenses 5, shown as four lenses 5a, 5b, 5c, 5d in the drawings. The turret plate 4 is rotatable around the reduced diameter portion 6 of a central boss 7 secured to the front wall 8 of the camera box, the boss 6 being separate from the front wall 8 but secured thereto by screws or in any other convenient manner after the turret plate has been positioned over the reduced diameter portion 6. The rear surface of the turret plate 4 has a recessed central portion within which is fitted a gear wheel 9 rigid with the turret plate 4 and of a thickness corresponding approximately to the depth of the recess in the back of the turret plate. This gear 9 meshes with a pinion 10 carried on the shaft 11 rotatable in a bearing 12 in the front wall 8, the inner end of the shaft 11 carrying a further pinion 13 which meshes through an idler pinion 14 with a pinion 15 freely rotatable about a tubular bearing 16 extending from the adjacent end plate 16' of the bearing frame 17 carried from the inner surface of the front wall 8.

Through the tubular bearing 16 passes a rod 18 which is connected, through the universal joint 19, to a rod 20 which extends through an aperture in the back wall 21 of the camera and terminates in an operating handle 22. The rod 20 is normally urged towards the front of the camera by a spring 23 positioned between the back wall 21 and a collar 24 on the rod 20. The front end of the rod 18 carries a pin 25 which is adapted to engage in index apertures 26 in the turret plate 4, the pin being normally spring-urged towards the turret plate by the spring 23. The front end of the rod 18 is slidable in a bearing 27 carried by the front wall 8 and on which is freely rotatable a sprocket wheel 30. The teeth of the sprocket engage a chain 31 which also passes over idler sprockets 32, 33 and a sprocket 34 on the end of a shaft 35 which extends through the boss 7. To the front end of the shaft 35 is secured a pinion 36 which meshes with three pinions 37 disposed therearound and rotatable on pins 28 projecting from the front surfaces of the boss 7. The pinions 37 in turn engage with the toothed internal periphery of a ring 38, the external periphery of which is also provided with a series of teeth 39. The shaft 35 is arranged eccentric to the axis of the boss 7 so that the toothed ring 38 is arranged towards one side of the boss and its teeth 39 can engage with the toothed segment 40 fast with the member for adjusting the iris diaphragm of the lens 5a which is in the operative position, that is the lens which is in line with the optical axis of the television pick-up tube in the camera. By rotating the shaft 35, the toothed ring 38 is rotated and moves the segment 40 to adjust the iris diaphragm of the lens in the operative position as will be more fully hereinafter described. The pinion 36, 37 and the ring 38 may be enclosed by a cover member 41 which has an opening 42 at the side thereof opposite the lens which is in the operative position to permit the teeth 39 of the ring 38 to engage with the toothed segment 40.

Carried by and fast with the rod 18 beween the pinion 15 and the sprocket 30 is a disc 45 having clutch teeth 46, 47 extending from each of its opposite surfaces, which clutch teeth are adapted to engage with the complementary clutch teeth on either one or other of two coaxial clutch parts 48, 49 rigid with the pinion 15 and the sprocket 30 respectively depending upon whether the turret control rod 20 is pulled rearwards or is resting in its advanced position with the pin 25, holding the turret plate 4 in an indexed position. When the rods 18 and 20 are in their forward position with the pin 25 in an indexing aperture 26 in the turret plate 4, the teeth 47 on the disc 45 engage the teeth 49 rigid with the sprocket wheel 30, whilst the teeth 46 are disengaged from the teeth 48 on the pinion 15. By rotating the handle 22 when the clutch disc 45 is in this position, the sprocket wheel 30 is driven to move the chain 31 and thus, through the intermediary of the sprocket 34, shaft 35 and pinions 36 and 37, rotate the teethed ring 38 to move the toothed segment 40 to adjust the iris diaphragm setting of the lens 5a in the operative position. When the handle 22 is pulled rearwardly, it retracts the rods 20 and 18 to pull the pin 25 out of the indexing aperture 26 on the turret plate 4, simultaneously disconnecting the teeth 47 of the disc 45 from the teeth 49 and engaging the teeth 46 of the disc with the teeth 48 rigid with the pinion 15. Upon now rotating the handle 22, the pinion 15 is rotated, and through the train of gears 14, 13, 10, 9, the turret plate 4 is rotated around the boss 7. As soon as the turret plate moves, the indexing aperture 26 moves out of alignment with the pin 25 and thus holds the rods 18 and 20 retracted until the turret plate 4 is turned through a quarter turn and the next indexing position is reached,
when the pin 25, under the action of the spring 23, moves forwards into the indexing aperture to disengage the teeth 46 and 48 and again engage the teeth 47, 49, whereby further rotation of the handle 22 actuates the diaphragm control of the lens now moved into the operative position and of which the toothed segment 40 is in mesh with the teeth 39 of the ring 38.

Figure 3:
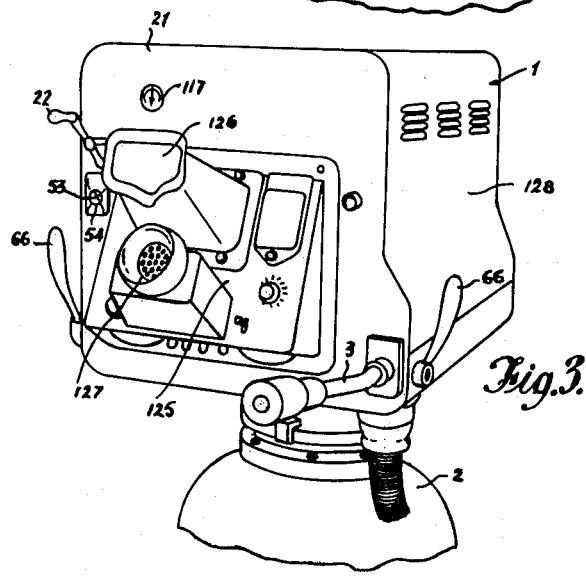
Fig. 3 shows a perspective view of the rear of the camera.

In mesh with the pinion 15 is a gear wheel 50 which is rotatable around the shaft 51 which is rotatable in bearings in the front and rear walls of the camera box. The gear 50 is coupled to drive the shaft 51 through a reduction gearing, such as an epicyclic gear, contained in the casing 52. The gear ratio of the wheel 50 and the epicyclic gear 52 with respect to the pinion 15 is made the same as the gear ratio between the pinion 15 and the gear wheel 9 fast with the turret plate 4 so that the turret plate 4 and the shaft 51 rotate at the same speed. The rear end of the shaft 51 carries a pointer 53 (Fig. 3) on the outside of the back wall 21 of the camera box, pointer 53 moving over a dial 54 to indicate, at the rear of the camera, which of the four lenses 5 on the turret is in the operative position.

The television pick-up tube 55 of the camera, with its associated amplifier 56, is mounted in a box 57 supported by the cradle 58 which is mounted for forward and backward movement within the camera box along the slide rails 59, extending between the front and back walls of the camera box and adjacent the top edges thereof. The cradle 58 carries bracket members 60 with the rollers 61 engaging with the rails 59, so that the path along which the cradle, and the pick-up tube mounted in the box 57, can move is guided along the optical axis of the lens 5 which is in the operative position. The pick-up tube box 57 is detachable from the cradle 58, being supported from the underside of the cradle by the interengaging dove-tail slides 62, 63 carried by the cradle 58 and the box 57 respectively. The box 57 is held secure with the cradle 58 by the screw 64, removal of the screw 64 permitting the box to be slid sideways and removed from the cradle for servicing. The electrical leads from the pick-up tube 55 and amplifier 56 in the box terminate in connectors 65 which can be plugged into complementary connectors mounted in the camera box.

The focussing of the camera is effected by adjusting the position of the box 57, and thus the pick-up tube 55, relative to the lens 5 by moving the cradle 58 back and forth along the rails 59. This movement is effected by the two focussing knobs or handles 66 carried at opposite ends of a shaft 67 which extends between both sides of the camera box and adjacent the rear thereof, so that the camera operator can focus the camera by actuating either one or other of the two knobs 66 located at opposite sides of the camera. The knobs 66 are rotatable through an arc of 180°, the movement being limited by stops (not shown). The shaft 67 is coupled, through reduction gearing contained in the box 68, with a longitudinally movable rod 69 connected through a ball joint 70 to one arm of a lever 71 pivoted to the bottom wall of the camera box at 72. The other arm of the lever 71 is connected through a rod 73, with ball joints at each of its ends, to the lower end of the focussing lever 74 which is pivoted for rocking movement about a fulcrum 75, the upper end of the focussing lever 74 being pivotally connected to the cradle 58 by the screw 76. Thus by rotating the handle 66 back and forth, the focussing lever 74 is rocked about the fulcrum 75 to move the box 57 towards or away from the lens 5 in the operative position.

It will be appreciated that the distance through which the cradle 58 must be moved to focus the camera from all distances between close ups and infinity will depend upon the particular lens 5 which is in the operative position. For simplicity of operation and in order to reduce as far as possible the risk of bad focussing during the televising of live scenes, it is desirable that the focussing handle 66 should move through the same arc, in order to cover the whole focussing range from close ups to infinity, irrespective of the lens which is in the operative positions. This is achieved in our improved camera by automatically shifting the position of the fulcrum 75 in accordance with the particular lens which is in the operative position. The ratio of movement between the operating handle 66 and the cradle 58 is automatically changed, when the turret is turned to bring another lens into the operative position, so that a full movement of the handle 66, which is 180° in the camera described, will move the cradle and pick-up tube through the distance necessary to focus the camera, with the particular lens in the operative position, through all desired distances up to infinity.

This automatic adjustment of the fulcrum 75 is effected by means of a control surface 79 on the plate 80 forming the support for the lens 5, which surface 79, when the associated lens is moved into the operative position, engages with and moves a tappet 72 slidable in the boss 7 to actuate gearing which adjusts the position of the fulcrum 75 in dependence upon the position of the tappet 82. The control surface 79 on the plate 80 is preferably constituted by a flat side surface on the plate which is spaced a predetermined distance from the axis of the lens, and thus also from the axis about which the turret plate 4 rotates, corresponding to the particular lens 5 mounted on the plate 80, and is adapted to bear against the roller 83 at the end of the tappet 82 when that lens is in the operative position and thus, through the train of gearing, adjusts the fulcrum 75 to a corresponding position.

The movement of the focussing tappet 82 is transmitted to a rack 84 arranged inside the camera box which meshes with the gear wheel 85 rotatable on a spindle 86 carried by the inside of the front wall 8 of the camera box, the gear 85 meshing with a pinion 87 secured on a shaft 88 rotatable in a bearing 89 carried by the fulcrum rack guide 90 secured in a vertical position within the camera box. Secured on the other end of the shaft 88 is a pinion 91 which meshes with the teeth of the fulcrum rack 92. The fulcrum rack 92 comprises a generally rectangular member having rack teeth 93 along one edge thereof and carrying the U-shaped bracket 94 carrying the fulcrum pin 75. The fulcrum rack 92 is vertically movable in the fulcrum guide 90 and is urged upwardly by the spring 95 connected between the fulcrum rack and the top of the fulcrum guide.

With the mechanism described, when the focussing tappet 82 is pushed into the boss 7, the pinion 91 rotates to drive the fulcrum rack 92 downwardly against the action of the spring 95 and thereby reduce the leverage ratio between the two arms of the focussing lever 74 on opposite sides of the fulcrum 75. When the tappet 82 is released, the spring 95 pulls the fulcrum rack 92 upwards, thereby pushing the focussing tappet 82 outwards. The tappet 82 moves into this position when the turret plate 4 is turning and no control surface 79 of a lens plate 80 is engaging therewith. Upon the control surface 79 of the lens plate 80 which is being moved into the operative position engaging with the focussing tappet 82, the gearing train is actuated to move the fulcrum rack 92 to the position corresponding to the control surface 79 to give the correct leverage ratio to the focussing lever 74 for the particular lens concerned.

The lenses are demountable from the turret plate and are carried by the plate member 80 which is provided with apertures or slots 77 by means of which they may be mounted over screwed studs 96 projecting from the turret plate 4, and secured thereto by means of captive nuts 97. The plate 80 is also provided with apertures 78 adapted to fit upon dowels 98 projecting from the turret plate 4 to locate the lens in the correct position on the turret. Two or more dowels are preferably provided which are preferably of different sizes so as to ensure that the plate 80 can only be mounted in a single position on the turret plate. The lens supporting plates 80 have their control surfaces 79 spaced from the axis of the lens by a distance corresponding to the particular lens which is mounted on the plate, so that when a lens unit is interchanged, the new lens supporting plate will automatically ensure the correct fulcrum setting for the substitute lens when it is in the operative position.

Our improved camera is also provided with a separate manual control means for shifting the position of the fulcrum 75 independently of the setting of the focussing tappet 82. This means comprises the slotted rod 100 which extends vertically through an aperture 101 in the bottom of the camera box, the slot 102 in the rod fitting over the end of the fulcrum pin 75. By pulling this rod down, the fulcrum pin 75 can be pulled to its lowermost position, corresponding to maximum movement of the cradle. In this position the lever may be held by a latch, shown as comprising a notch 103 in the side of the rod 100 which is adapted to engage with the bottom wall of the camera casing, a spring 104 being provided for urging the notch 103 into engaging position. To release the manual control rod 100, it is moved sideways against the action of the spring 104 to release the notch 103, whereby it can be moved upwards either manually or by the spring 95 acting on the fulcrum rack 92. The rod 100 may be held in its uppermost position by a further notch 105 in its side and adapted to engage with the bottom wall of the camera box. The rod 100 may be moved up and down by the bent handle 106 extending beneath the bottom wall of the camera box. The slot 102 in the rod enables the fulcrum normally to move up and down under the action of the focussing adjusting tappet without restraint.

For actuating the iris diaphragm of a lens, the diaphragm control ring 107 of the lens is rigidly connected to a plate 108 having a toothed segment 40 on its periphery which meshes with the teeth 39 on the outer periphery of the ring 38 when that lens is moved into the operative position. The adjustment of the iris diaphragm is effected by rotating the handle 22 when the rod 20 is in its foremost position, the drive being effected through the chain 31 as previously described.

For indicating, at the rear of the camera, the diaphragm setting, the plate 108 secured thereto a cam plate 109 of which the cam surface is adapted to engage and move a second tappet 110 slidable in the central boss 7 as the cam is turned. This iris tappet 110 is rigid with a rod 111 arranged inside the camera box, the end of which engages, through the pin 112 with the slot 113 in one arm of a bell crank lever 114 which can rock about the spindle 115 carried from the front wall 8 of the camera box. The second arm 116 of the bell crank lever 114 actuates the mechanism for transmitting the movement of the arm to actuate the iris diaphragm indicator 117 arranged on the back wall of the camera. This transmission mechanism may be of any convenient type, for example, electrical or mechanical, and is shown as a hydraulic system comprising a pair of Sylphon bellows 118, 119 interconnected by the oil pipe line 120. The bellows 118 is actuated by the movement of the arm 116 and produces corresponding movement of the bellows 119 for actuating the iris diaphragm indicator 117.

Each of the iris diaphragm cams 109 carried by the lenses is designed to correspond with the iris diaphragm of the particular lens by which it is carried so that a correct indication is given on the indicator 117 of the diaphragm setting of the lens in the operative position. A limited adjustment between the cam 109 and the iris diaphragm may be effected by the diaphragm control ring 107 of the lens being secured to the plate 108 and the cam 109 by bolts 121 passing through slots 122 in the ring 107.

Since a wide range of lenses may be mounted on the turret plate of which the iris diaphragm cams 109 may be of widely different shape, means are provided for withdrawing the iris tappet 110 whilst the turret plate is turning, and allowing it to move back into engagement with the iris cam as the turret approaches an indexing position. This avoids the damage which might take place if the turret were rotated in a direction opposite to the lead-in direction of the cam, and enables the turret to be rotated in either one direction or the other. For this purpose the shaft 51 carries a square or cross-shaped cam 123 which engages the end of the arm 116 of the bell-crank lever 114, when the cam 123 is turned, to move the bell-crank lever and withdraw the iris tappet 110 into the central boss 7. As above explained, the shaft 51, and consequently the cam 123, rotate at the same speed as the turret plate 4, so that when the turret reaches an intermediate position, the cam 123 depresses the arm 116 to retract the iris tappet 110, the cam 123 moving out of engagement with the arm 116 as the turret approaches an indexing position to allow the iris tappet 110 to move outwards and engage with the surface of the iris cam 109, which already lies in the path of the tappet, of the lens which is moving into the operative position. When the cam 123 is in its normal position, corresponding to an indexing position of the turret, the cam 123 is spaced from the arm 116 of the bell-crank lever 114 so that the movement of the latter takes place in accordance with the movements of the iris tappet 110 and without restraint by the cam 123.

Also carried within the camera is the chassis 124 for the camera time base equipment. Also detachably mounted in the rear wall of the camera box is an electronic view finder 125 of which the view finder aperture is indicated at 126. Directly therebeneath may be arranged the mouth piece 127 of a microphone, by means of which the camera operator can talk back to the control room. The camera is closed at its sides and top by removable cover plates 128 and the turret plate may also be enclosed by a cover plate 129 secured to the bracket member 130 carried by the front of the turret plate.

Whilst a particular embodiment has been described, it will be understood that various modifications may be made without departing from the scope of the invention. For example, the adjustment of the iris diaphragm of the lens in the operative position may be effected through a friction drive instead of gear teeth as illustrated. Furthermore, although the invention is particularly applicable to television cameras, it can also be applied to conventional motion picture or other photographic cameras or optical apparatus.

Moreover, the indication of the iris diaphragm setting may be transmitted electrically to the indicator. This method has the advantage that the iris diaphragm setting can be indicated not only on the camera but also at other remote points of the television control equipment. One form of such a modification is illustrated in Figure 11 of the accompanying drawings, which diagrammatically indicates the iris diaphragm cam 109 which actuates the iris tappet 110 to move, through an appropriate lever 131, the movable contact arm of a potentiometer 132 connected across a source of voltage. The setting of the potentiometer is varied in accordance with the setting of the iris diaphragm and produces a corresponding indication in the meters 133, 133' etc., which may be located respectively on the camera and at other parts of the equipment in the camera chain.

We claim:

1. In a camera having a camera body and a turret that carries a plurality of different lens units and is movable relative to the camera body selectively into any one of a plurality of different main positions, each defined by a different one of the lens units being placed in an operative position relative to the camera body, each lens unit including a lens, a mounting carrying said lens, and, also carried by said mounting, an adjustable iris diaphragm having a diaphragm-adjusting member rotatable about the optical axis of the lens for adjusting the aperture of the diaphragm, the provision in each lens unit of a cam member and of an arcuate gear member, both connected to said diaphragm-adjusting member for joint movement therewith independently of the setting members of the other lens units, combined with the provision of a diaphragm-driving gear rotatably mounted in the camera body at such a position relative to the turret, as to individually engage, at each main position of the turret, the arcuate gear member of that particular lens unit which is in the operative position without engaging the gear member of any other lens unit, actuating means for said diaphragm-driving gear, also mounted in the camera body, a feeler member movably mounted in the camera body for individual cooperation with the cam member of each lens unit when such unit is in the operative position, an aperture-indicating means, and means for operatively connecting said feeler member and indicating means, each said cam member being so shaped as to constrain at each position of the diaphragm adjusting member said feeler member and indicating means to a position solely dependent upon the relative aperture of the lens unit as determined by the adjustment of its iris diaphragm.

2. In a camera as claimed in claim 1, the provision of a shaft mounted in the camera for rotation and axial displacement and provided with a driving handle at the rear of the camera, a first clutch member fast with said shaft, a further clutch member, fast with said diaphragm-driving gear and located so as to engage with said first clutch member when said shaft is moved to one end of its axial displacement, and a third clutch member operatively connected with the turret for common rotation therewith and located so as to engage with said first clutch member when said shaft is moved to the other end of its axial displacement in order to move said turret for bringing another unit to the operative lens position.

3. In a camera as claimed in claim 2, the provision of an indexing stop for the turret, the turret being formed with a smooth surface having recesses for indexing co-operation with said stop at each main position of the turret, said indexing stop being fixed with said shaft so as to be drawn from such indexing cooperation by the movement of said shaft, when the shaft is displaced axially to engage said third clutch member, and to prevent, by cooperation with said smooth surface, movement of the shaft and third clutch member out of engagement with said first clutch member except when said turret is in one of its main positions.

4. In a television camera the combination of: a camera housing having a picture admission opening at one end, a plurality of lens units; a turret on which said lens units are mounted for selective movement into an operative position in line with said opening, each lens unit including an iris diaphragm, a movable diaphragm-adjusting member, and a cam arranged for movement jointly with said adjusting member; a driving member movably mounted in the camera, said driving member and adjusting members being so disposed in the camera and the turret respectively as to permit when a lens unit on the turret is in line with said opening, said driving member to engage the diaphragm adjustment member of said unit for individually altering the diaphragm setting of said unit without affecting the diaphragm settings of the other lens units; an actuating means for said driving member, arranged at a point remote from the said opening; a cam follower member movably mounted at the front of the camera in a position for co-operation with the cam of each said lens unit when such unit is placed in line with said opening, and means for normally holding said follower in contact with said cam; a diaphragm stop indicator located adjacent said actuating means; and means for automatically controlling the indication of said indicator in accordance with the position of said cam follower, each said cam member being so shaped as to constrain at each position of the adjusting member said cam follower member to a position which, irrespective of which of said lens units is in the operative position, is solely dependent upon the relative aperture of such lens unit as determined by the adjustment of its iris diaphragm.

5. In a television camera the combination of: a camera housing having a picture admission opening at one end; a plurality of lens units; a turret on which said lens units are mounted for selective movement into an operative position in line with said opening, each lens unit including an iris diaphragm, a diaphragm-adjusting ring rotatable about the optical axis of the lens, and a cam arranged for movement jointly with said adjusting member; a driving member movably mounted in the camera, means for producing operative connection between said driving member and the diaphragm-actuating ring of each said lens unit when such unit is in said position; an actuating means for said driving member, arranged at a point remote from the said opening; a cam follower member movably mounted at the front of the camera in a position for co-operation with the cam of each said lens unit when such unit is placed in line with said opening, and means for normally holding said follower in contact with said cam; a diaphragm stop indicator located adjacent said actuating means, and means for automatically controlling the indication of said indicator in accordance with the position of said cam follower, each said cam member being so shaped as to constrain at each position of the adjusting member said cam follower member to a position which, irrespective of which of said lens units is in the operative position, is solely dependent upon the relative aperture of such lens unit as determined by the adjustment of its iris diaphragm.

6. In a television camera the combination of: a camera housing having a picture admission opening at one end; a plurality of lens units; a turret on which said lens units are mounted for selective movement into an operative position in line with said opening, each lens unit including an iris diaphragm, a movable diaphragm-adjusting member, and a cam arranged for movement jointly with said adjusting member; a driving member movably mounted in the camera, means for operatively connecting said driving member to the diaphragm-adjusting member of each unit when the same is in the operative position; an actuating means for said driving member, arranged at the back of the camera; a cam follower member movably mounted at the front of the camera in a position for co-operation with the cam of each said lens unit when such unit is placed in line with said opening, and means for normally holding said follower in contact with said cam; a diaphragm stop indicator located adjacent said actuating means, and means for automatically controlling the indication of said indicator in accordance with the position of said cam follower, each said cam member being so shaped as to constrain at each position of the adjusting member said cam follower member to a position which, irrespective of which of said lens units is in the operative position, is solely dependent upon the relative aperture of such lens unit as determined by the adjustment of its iris diaphragm.

7. In a camera having a movable turret carrying a plurality of different lens units which by movement of said turret can be selectively placed in an operative position relative to the camera, each lens unit comprising a mounting carrying a lens, an adjustable aperture iris diaphragm, and a diaphragm-adjusting member rotatable about the optical axis of the lens for adjusting the aperture of said diaphragm, the provision in each lens unit of a cam member connected to said adjusting means for joint movement therewith, combined with the provision in the camera of a feeler member mounted for individual co-operation with the cam member of each lens unit when said unit is in the operative position, an aperture-indicating means, means for operatively connecting said feeler member and indicating means, turret operating means, and means controlled by said turret operating means, for withdrawing the feeler member out of the path of said cam members, each said cam member being so shaped as to constrain at each position of the adjusting member said feeler member and indicating means to a position solely dependent upon the relative aperture of the lens unit as determined by the adjustment of its iris diaphragm.

References Cited in the file of this patent

UNITED STATES PATENTS

| | | |
|---|---|---|
| 1,507,477 | Wisnieski et al. | Sept. 2, 1924 |
| 1,736,436 | Fuerst | Nov. 19, 1929 |
| 1,795,325 | Wittel | Mar. 10, 1931 |
| 2,000,090 | Mitchell | May 7, 1935 |
| 2,065,993 | Billing | Dec. 29, 1936 |
| 2,129,562 | Brueck | Sept. 6, 1938 |
| 2,256,208 | Leitz et al. | Sept. 16, 1941 |
| 2,315,406 | Eddy | Mar. 30, 1943 |
| 2,319,304 | Dalotel | May 18, 1943 |
| 2,355,136 | Bedford | Aug. 8, 1944 |
| 2,388,609 | Ericsson | Nov. 6, 1945 |
| 2,541,469 | Guinchard | Feb. 13, 1951 |
| 2,552,940 | Cornut | Sept. 12, 1951 |

FOREIGN PATENTS

| | | |
|---|---|---|
| 531,524 | France | Oct. 26, 1921 |
| 703,215 | Germany | Mar. 4, 1941 |
| 703,827 | Germany | Mar. 17, 1941 |